April 26, 1949.    R. S. NELSON    2,468,102
PICKER FOR LOOMS

Filed Aug. 5, 1944    2 Sheets-Sheet 1

RICHARD S. NELSON
INVENTOR.

BY *H. A. McGrew*
   *attorney*

April 26, 1949. R. S. NELSON 2,468,102
PICKER FOR LOOMS
Filed Aug. 5, 1944 2 Sheets-Sheet 2

RICHARD S. NELSON
INVENTOR.

BY

Patented Apr. 26, 1949

2,468,102

UNITED STATES PATENT OFFICE 2,468,102

PICKER FOR LOOMS

Richard S. Nelson, Denver, Colo.

Application August 5, 1944, Serial No. 548,167
In Great Britain August 6, 1943

4 Claims. (Cl. 139—159)

This invention relates to pickers for looms. In the operation of the loom, a shuttle moving in an oscillatory cycle strikes the picker, which acts as a movement-arresting medium. In the past it has been customary to make the pickers from animal hide, such as the skin of water buffalo, which is soaked for a considerable period in sperm oil and then slowly dried to form a tough, durable material that is able to withstand many abrasive influences and much impact without serious deformation.

However, due to shortages occasioned by the war, it is necessary to use substitute materials in forming the pickers. Certain synthetic compositions, such as plastics, have many desirable properties for this purpose, but tend to produce excess wear on the metallic points of the shuttles.

It is an object of the present invention to provide a novel picker design that is suited for embodiment in a variety of materials, and which will not cause excessive wear on the shuttles with which it is used.

Another object of the invention is to provide a picker having a considerable degree of resilience serving as a shock-absorber during impact with the shuttle with which it is used.

Other objects reside in novel details of construction and novel combinations and arrangements of parts, all of which will appear more fully in the course of the following description.

The accompanying drawings illustrate typical embodiments of the invention. In the drawings in the several views of which like parts have been designated similarly, Figure 1 is a side elevation of a picker embodying features of the present invention;

Figure 2:
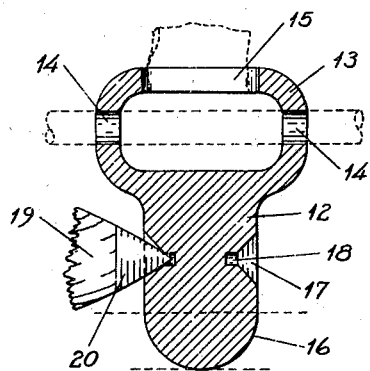
Figure 2 is a section taken along the line 2—2, Figure 1.
Figure 1:
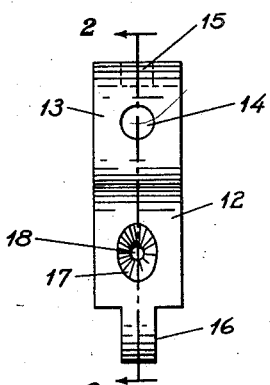

Referring first to the form of picker illustrated in Figures 1 and 2, a body portion 12 has an enlarged hollow portion 13 at its upper end which has two alined apertures 14 permitting a rod to be extended through the hollow portion for the support of the picker, as indicated by the dotted line representation in Figure 2.

The top of the enlarged portion 13 is also apertured at 15 to receive a strap which guides or directs the movements of the picker. The lower end of the picker terminates in a narrow segmental tongue portion 16 which is adapted to fit in a groove and limit movement of the picker laterally of the rod on which it is mounted. Representation of the strap and groove appear in dotted lines in Figure 2.

Intermediate the enlarged portion 13 and tongue 16, the sides of body 12 are provided with countersinks 17, shaped somewhat longer from top to bottom than from side to side, and terminating interiorly of body 12 in a central, cylindrical recess 18 of small dimension.

In use, a shuttle 19 having a pointed metallic tip 20 moves into register with one of the countersinks 17 and strikes body 12 with considerable force. The picker must absorb or dissipate the force of the impact, and if the material of the picker is too hard, serious damage to the tip results, while material that is too soft will not wear long enough to justify its use.

The instant design avoids the defects heretofore existing in this art and permits the use of a variety of plentiful materials that previously it has not been feasible to use. Certain plastic compositions are particularly suited for this purpose, urea-formaldehyde and phenol-formaldehyde compositions being recommended. Fabric reenforcement may be used or the picker may be molded of these plastics with a twine or string filler.

Lighter metals, such as aluminum or magnesium, may be used, and if desired, the countersink and recess may be lined with a hard material, such as manganese, to provide a wear-surface that will withstand the force of the impact over a long period of time.

By using the present design of picker, the force of the impact is put onto the sides of tip 20 rather than on the point which is spaced from the closed end of recess 18 at its extreme position of penetration. The provision of the pre-formed hole prevents deformation of the picker as would otherwise occur, and the oval or oblong shape allows entrance and withdrawal of the shuttle without frictional resistance thereto.

The contour of the picker on one side of the lengthwise axis is symmetrical with the portion on the opposite side of the axis, permitting a reverse mounting of the picker on the rod when countersink 17 and adjoining parts of body 12 wear excessively.

Figure 4:
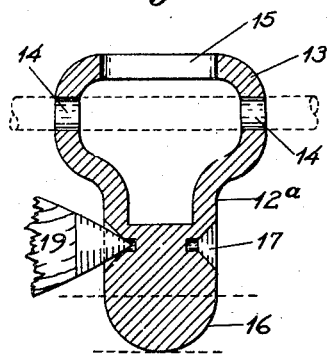
Figure 4 is a section taken along the line 4—4, Figure 3.
Figure 3:
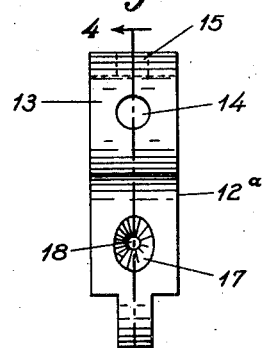
Figure 3 is a side elevation of a modified form of picker.

The form of the invention illustrated in Figures 3 and 4 is identical with the picker hereinbefore described except that the body portion 12a is hollowed above countersinks 17 to form an extension of the hollow portion of enlargement 13, thereby increasing the resilience of the impact surfaces of the picker.

The pickers illustrated in Figures 5 through 8 are designed for use in "Automatic" type looms. In these machines the pickers are mounted on an upstanding member in rigid connection therewith.

Figure 5:
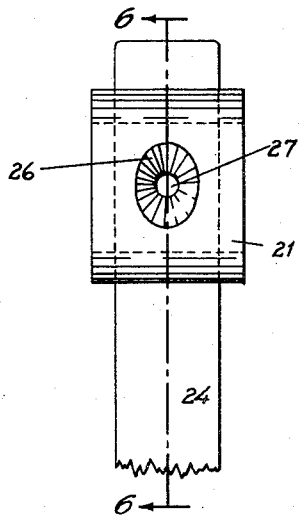
Figure 5 is an end elevation of another form of picker for use in "Automatic" looms.
Figure 6:
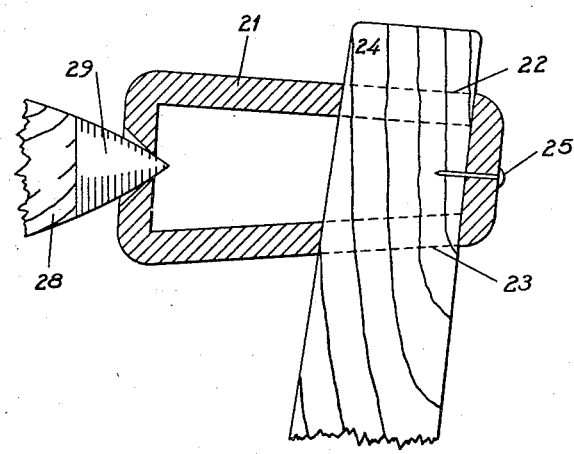
Figure 6 is a section taken along the line 6—6, Figure 5.

In Figures 5 and 6 the picker has been designated by the reference numeral 21, and has top and bottom registering slots 22 and 23 respectively, for reception of one end of the upright member 24. A suitable fastening such as a nail 25 holds the picker against relative movement on member 24.

At the end of picker 21 remote from member 24, a countersink 26 terminates in a small central aperture 27 extending through the inner wall of the picker, and a shuttle 28 generally similar to the shuttle 19 and provided with a conical metallic tip 29 engages countersink 26 in the operation of the loom mechanism.

Figure 7:
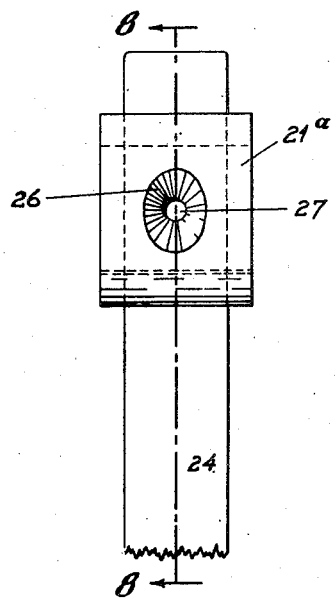
Figure 7 is an end elevation of a modified form of picker for use in "Automatic" looms.
Figure 8:
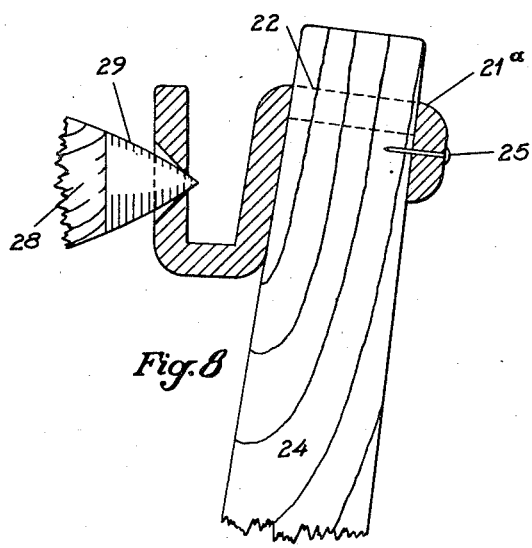
Figure 8 is a section taken along the line 8—8, Figure 7.

The picker illustrated in Figures 7 and 8 differs from the form shown in Figures 5 and 6 principally in its shape. As clearly shown in Figure 8 the body of picker 21a is generally S-shaped with a single slot 22 to admit the member 24 and the portions of body 21a adjoining slot 22 are shaped to lie flat along the sides of member 24, and are fastened thereon by a nail, screw or the like 25.

The portion of body 21a on the side of member 24 facing shuttle 28 is substantially U-shaped and the outermost stretch of the U-portion has a countersink 26 and central aperture 27 disposed to receive the tip 29 of a shuttle 28 with which it is associated in the operation of the loom.

In operation, either of the pickers 21 or 21a is mounted on the upstanding member 24 in the manner shown, and the oscillatory action of shuttle 28 serves to bring its tip 29 into engagement with the tapered surfaces of countersink 26. The point of shuttle 28 penetrates through the opening 27 and such wear as may be imparted to the tip 29 is distributed over the conical surface thereof rather than against the point as has heretofore been customary in the art.

Pickers of these types also may be made of the variety of materials hereinbefore enumerated, and due to the durability of such materials coupled with the resilience afforded by the shapes of these designs, the pickers are suited for continuous operation for extremely long intervals without excessive deformation and without substantial damage to the shuttles with which they are used.

In this connection, the oval shape of the countersink effectively guides the entrance and withdrawal of the shuttle and thus insures penetration of the tip into the central recess and removal therefrom without damage to the point of the tip portion.

The designs described and illustrated herein represent typical embodiments of the invention and it will be appreciated that pickers in various other shapes and sizes utilizing an oval or conical countersink and central recess may be formed within the spirit and scope of the invention.

While the various materials enumerated herein are suited for the purposes of the present invention, I have found in practice that the molded plastic compositions hereinbefore described are particularly suited for such purpose, since they provide extremely durable wear surfaces and yet possess a considerable degree of resilience. Also, a combination of spun glass and plastic may be utilized with very good results. Other types of materials also will suggest themselves, and so long as they possess the properties of resilience combined with wear-resistance to the shuttle impact, satisfactory results will be obtained by employing the various designs described and shown herein.

Certain changes in the structural design also are within contemplation of the present invention. For example, Figs. 2 and 4 illustrate a form of picker which is more or less conventional design so far as exterior contour is concerned. The repeated impact of the shuttle over a considerable period of time serves to deform the material of the body to a considerable extent. Taking Fig. 2 as illustrative, the body portion 12 is relatively narrow as compared with the enlarged hollow portion 13. One contemplated modification involves extending the sides of the body in a straight line from the curved tongue portion 16 to the enlarged portion 13 to contact the lower curve of the latter at a point of tangency, and thus provide a substantially greater width in the body portion in the plane of the countersinks 17. When the body is so formed the individual recesses 18 will be replaced by a bore of equivalent diameter extending through the body from one countersink 17 to the other countersink at the opposite side of the body.

Similarly, in the form of the invention illustrated in Fig. 6, the wall in which the countersink 26 is located is shown as being relatively thin. However, it will be understood that this showing is not intended as a dimensional limitation, and if desired, this portion may be several times the thickness shown, with the opening 27 in preferred form again extending entirely through the wall.

The various forms described and illustrated herein are intended merely as typical examples of the practice of the invention, the scope of which is defined in the hereunto appended claims.

What I claim and desire to secure by Letters Patent is:

1. A picker for looms of the type adapted to receive the impact of a shuttle, comprising a resilient body having spaced portions, one of said portions having an opening to receive the picker stick of a loom, said portion having two opposed points of support in frictional engagement with said stick, and another portion of said body having at least one recess formed therein positioned and arranged to engage the sides of the shuttle adjacent its point and a cooperating space into which said shuttle point projects without contact with a surface of the picker.

2. A picker for looms of the type adapted to receive the impact of a shuttle, comprising a resilient body formed as a hollow loop and having spaced portions, one of said portions being adapted to receive the picker stick of a loom, said portion having two opposed openings adapted to provide points of support in frictional engagement with said stick, and another portion of said body having at least one recess formed therein positioned and arranged to engage the sides of the shuttle adjacent its point and a cooperating space into which said shuttle point projects without contact with a surface of the picker, said hollow loop thereby providing both a space to receive said picker stick and said shuttle point.

3. A picker for looms as defined in claim 2, wherein the hollow loop of said resilient body has walls of equal thickness throughout.

4. A picker for looms of the type adapted to receive the impact of a shuttle, comprising a substantially S-shaped, resilient body having spaced portions, one of said portions having an opening to receive the picker stick of a loom, said portion having two opposed points of support in frictional engagement with said stick, and another portion of said body having a recess formed therein positioned and arranged to engage the sides of the shuttle adjacent its point and a cooperating space into which said shuttle point projects without contact with a surface of the picker.

RICHARD S. NELSON.

REFERENCES CITED

The following references are of record in the file of this patent:

UNITED STATES PATENTS

| Number | Name | Date |
| --- | --- | --- |
| 17,468 | Mayall | June 2, 1857 |
| 417,665 | Chippendale | Dec. 17, 1889 |
| 2,149,568 | Bacon | Mar. 7, 1939 |
| 2,357,010 | Krueger | Aug. 29, 1944 |

FOREIGN PATENTS

| Number | Country | Date |
| --- | --- | --- |
| 6,291 | Great Britain | 1884 |
| 399,424 | Great Britain | Oct. 5, 1933 |